United States Patent
Saracco

(10) Patent No.: US 10,598,943 B2
(45) Date of Patent: Mar. 24, 2020

(54) METHOD AND APPARATUS FOR COLLIMATING LIGHT FROM A LASER DIODE

(71) Applicant: Microvision, Inc., Redmond, WA (US)

(72) Inventor: Matthieu Saracco, Redmond, WA (US)

(73) Assignee: Microvision, Inc., Redmond, WA (US)

( * ) Notice: Subject to any disclaimer, the term of this patent is extended or adjusted under 35 U.S.C. 154(b) by 165 days.

(21) Appl. No.: 15/917,216

(22) Filed: Mar. 9, 2018

(65) Prior Publication Data

US 2019/0278096 A1 Sep. 12, 2019

(51) Int. Cl.

| G02B 27/09 | (2006.01) |
|---|---|
| G02B 19/00 | (2006.01) |
| G02B 26/10 | (2006.01) |
| H04N 9/31 | (2006.01) |
| G02B 27/01 | (2006.01) |

(52) U.S. Cl.
CPC ..... *G02B 27/0955* (2013.01); *G02B 19/0014* (2013.01); *G02B 19/0052* (2013.01); *G02B 26/105* (2013.01); *G02B 27/0916* (2013.01); *H04N 9/3129* (2013.01); *H04N 9/3161* (2013.01); *G02B 27/0172* (2013.01); *G02B 2027/0114* (2013.01); *G02B 2027/0178* (2013.01)

(58) Field of Classification Search
None
See application file for complete search history.

(56) References Cited

U.S. PATENT DOCUMENTS

| 6,945,652 B2 * | 9/2005 | Sakata | G03B 21/2033 |
|---|---|---|---|
| | | | 348/201 |
| 2008/0165425 A1 * | 7/2008 | Cayer | G02B 27/0927 |
| | | | 359/641 |
| 2018/0292662 A1 * | 10/2018 | Cayer | G02B 27/0955 |

* cited by examiner

*Primary Examiner* — Jennifer D. Carruth
(74) *Attorney, Agent, or Firm* — Kevin D. Wills

(57) ABSTRACT

A bi-acylindrical lens collimates a divergent elliptical laser beam. A first surface of the bi-acylindrical lens is shaped to form a first acylindrical lens, and a second surface of the bi-acylindrical lens is shaped to form a second acylindrical lens. The first acylindrical lens collimates the divergent elliptical laser beam on the fast axis, and the second acylindrical lens collimates the diverging elliptical laser beam on the slow axis.

14 Claims, 11 Drawing Sheets

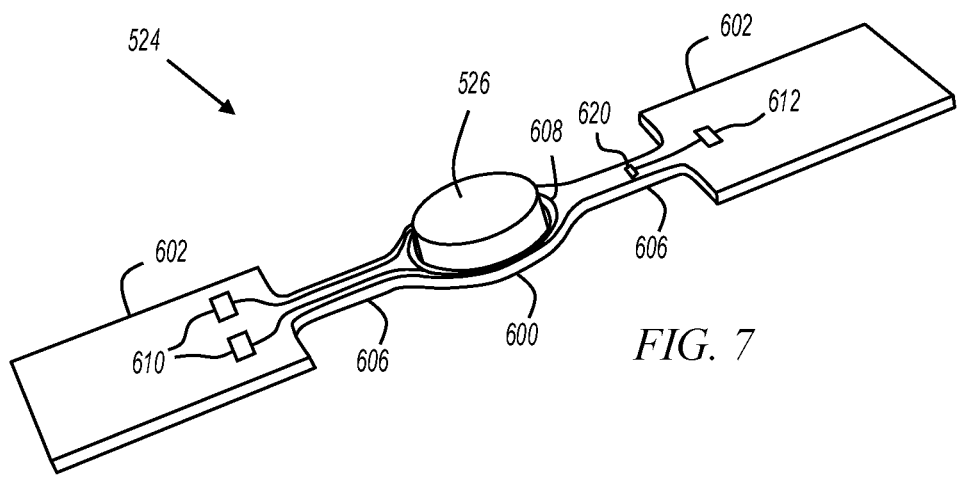
FIG. 7
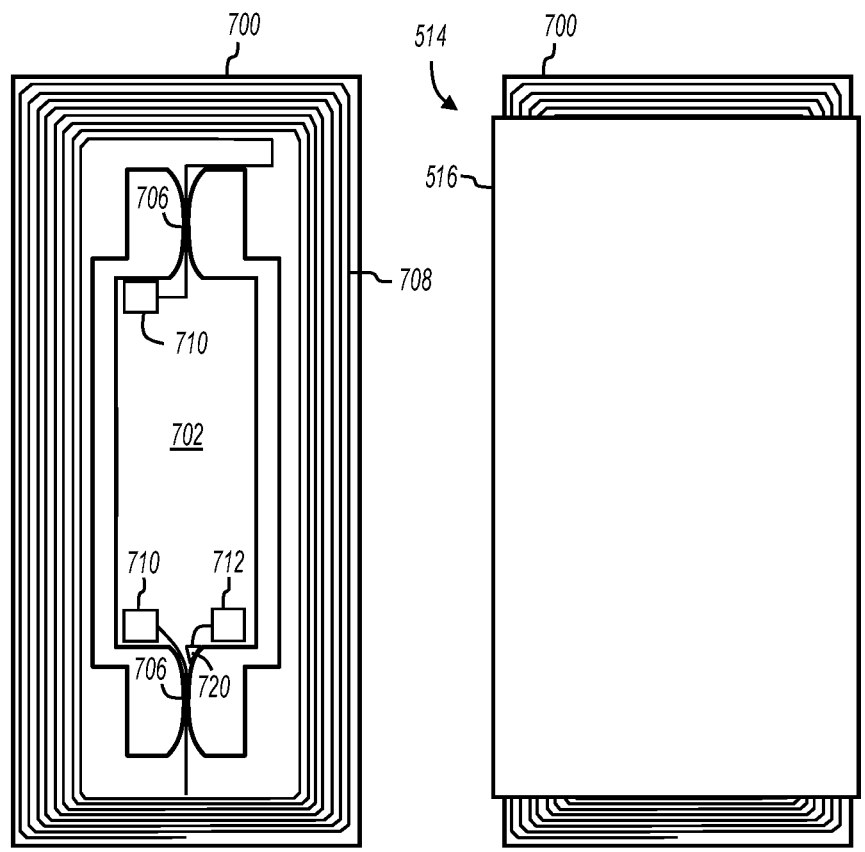
FIG. 8A
FIG. 8B

METHOD AND APPARATUS FOR COLLIMATING LIGHT FROM A LASER DIODE

FIELD

The present invention relates generally to collimating laser light, and more specifically to collimating laser light into a circular beam.

BACKGROUND

Laser diodes are typically highly astigmatic light sources. Because of their astigmatic nature, laser diodes typically emit elliptical light beams. When placing an aspherical collimating lens in front of a laser diode, the resulting beam typically focuses at different locations in the X and Y directions. This may not be desirable for applications in which a round collimated beam is desired.

BRIEF DESCRIPTION OF THE DRAWINGS

FIG. 7 shows a perspective view of a MEMS device with a scanning mirror in accordance with various embodiments of the present invention;

FIGS. 8A and 8B show plan views of a MEMS device with a scanning mirror in accordance with various embodiments of the present invention;

DESCRIPTION OF EMBODIMENTS

Figure 1:
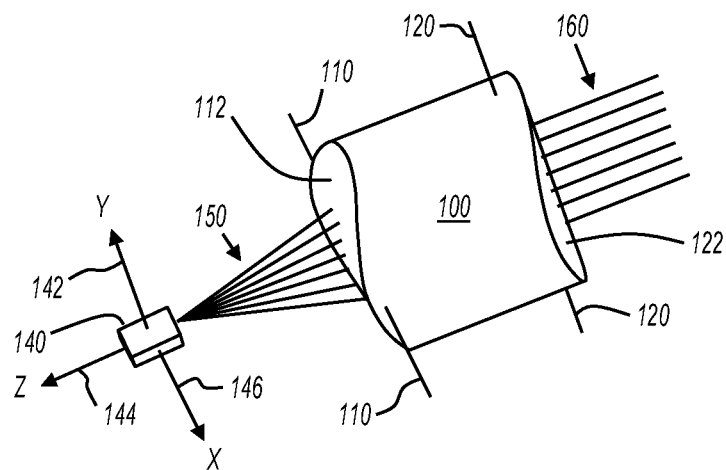
FIG. 1 shows a perspective view of a bi-acylindrical lens in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a perspective view of a bi-acylindrical lens in accordance with various embodiments of the present invention. Bi-acylindrical lens 100 includes two surfaces 112 and 122. Surface 112 is shaped as an acylindrical lens with axis 110, and surface 122 is shaped as an acylindrical lens with axis 120. Axis 120 is oriented at substantially 90 degrees with respect to axis 120. As used herein the term "substantially 90 degrees" refers to an angular relationship that is either exactly 90 degrees, or so close to 90 degrees that a human eye can not tell the difference.

FIG. 1 also shows laser diode 140. The orientations of both laser diode 140 and bi-acylindrical lens 100 in three dimensional space are described using a rectangular coordinate system with laser diode 140 being at the origin. The y-axis direction 142 is referred to herein as the fast axis of the laser diode, and the x-axis direction 146 is referred to herein as the slow axis of the laser diode. The z-axis direction 144 is parallel to the center of the laser beam 150 emitted by laser diode 140, and passes through the center of bi-acylindrical lens 100.

In operation, laser diode 140 emits laser light beam 150. In some embodiments, laser light beam 150 emits a divergent elliptical light beam that diverges at different rates in different directions. For example, in some embodiments, laser light beam 150 diverges faster on the fast axis than it does on the slow axis, thereby creating a divergent elliptical light beam.

Figure 2A:
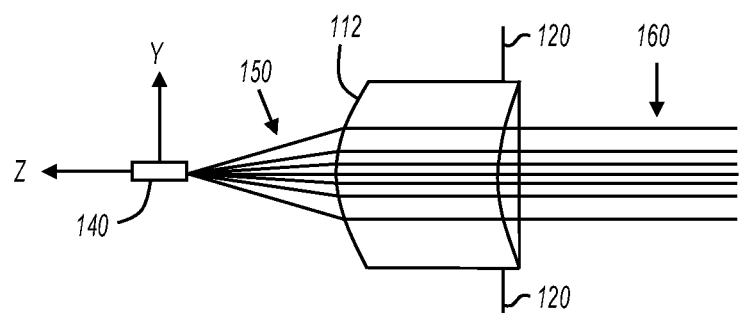
FIGS. 2A and 2B show plan views of the bi-acylindrical lens of FIG. 1 in accordance with various embodiments of the present invention.
Figure 2B:
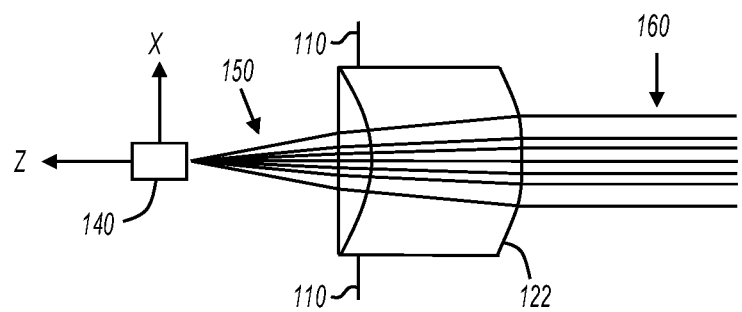

Axis 110 of the acylindrical lens formed on surface 112 is oriented at substantially 90 degrees with respect to the fast axis of laser diode 140. As a result, the acylindrical lens formed on surface 112 collimates beam 150 on the fast axis, but does not collimate beam 150 on the slow axis. This is shown in FIGS. 2A and 2B. FIG. 2A shows beam 150 being collimated on the fast axis by the acylindrical lens formed on surface 112, and FIG. 2B shows beam 150 not being collimated on the slow axis by the acylindrical lens formed on surface 112.

Axis 120 of the acylindrical lens formed on surface 122 is oriented at substantially 90 degrees with respect to the slow axis of laser diode 140. As a result, the acylindrical lens formed on surface 122 collimates beam 150 on the slow axis, but does not collimate beam 150 on the fast axis. This is shown in FIGS. 2A and 2B. FIG. 2A shows beam 150 being collimated on the slow axis by the acylindrical lens formed on surface 122, and FIG. 2B shows beam 150 not being collimated on the fast axis by the acylindrical lens formed on surface 122. Having been collimated on both the fast axis and the slow axis by bi-acylindrical lens 100, the light beam emerges from lens 100 as a round collimated beam 160.

As used herein, the term "divergence ratio" refers to the rate of divergence on the slow axis divided by the rate of divergence on the fast axis. In some embodiments, the focal lengths of the two acylindrical lenses are matched to the divergence ratio of beam 150. Take for example a laser diode with a divergence ratio of 0.62. A bi-acylindrical lens to collimate the resulting divergent elliptical light beam may include a first acylindrical lens with a focal length of 1.5 millimeters (mm) to collimate light on the fast axis and a second acylindrical lens with a focal length of 2.42 mm to collimate light on the slow axis. The distance between the two surfaces of the lens is made such that in their individual planes, the focal lengths of the two acylindrical lenses match the emission point location of the laser diode.

Figure 3A:
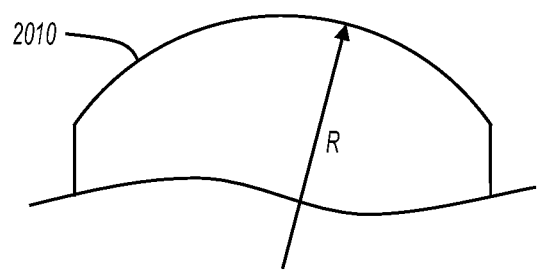
FIG. 3A shows a surface shaped as a cylindrical lens.
Figure 3B:
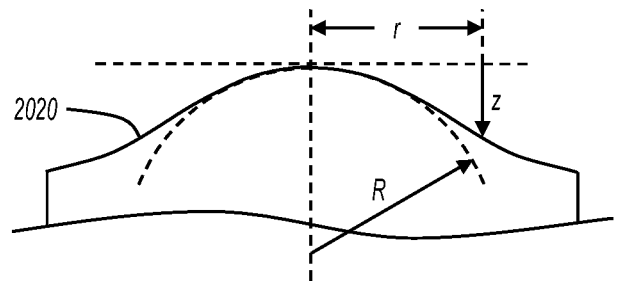
FIG. 3B shows a surface shaped as an acylindrical lens.

In some embodiments, the two lenses formed on surfaces 112 and 122 are perfectly cylindrical. In these embodiments, each lens has a constant radius curvature (spherical cross section) in one dimension. This is shown in FIG. 3A where surface 2010 is shaped to be a cylindrical lens. In other embodiments, the lens shapes may be acylindrical. For example, the lens shapes may include an aspherical component with higher order terms to limit aberrations. This is shown in FIG. 3A where surface 2020 is shaped to be an acylindrical lens.

The shape of an acylindrical lens can be described as shown in equation 1.

$$z(r) = \frac{r^2}{R\left(1 + \sqrt{1 - (1+\kappa)\frac{r^2}{R^2}}\right)} + \alpha_4 r^4 + \alpha_6 r^6 + \ldots \quad (1)$$

Equation 1 describes an acylindrical shape that includes a conic constant κ and higher order terms. Some embodiments include higher order terms, and some embodiments do not. Example values for κ and the resulting conic sections include:

κ<−1 hyperbola;
κ=−1 parabola;
−1<κ<0 ellipse (surface is a prolate spheroid);
κ=0 sphere; and
κ>0 ellipse (surface is a oblate spheroid).

In some embodiments, lens 100 is made of glass. For example, a glass blank may be ground with two cylindrical or acylindrical surfaces to form lens 100. In other embodiments, lens 100 is made of material other than glass. For example, lens 100 may be formed using plastic molding techniques. In some embodiments, lens 100 is made of material with a high refractive index (e.g., 1.8-2.0) to help lower the surface curvature of the acylindrical lens and reduce aberrations.

Figure 4:
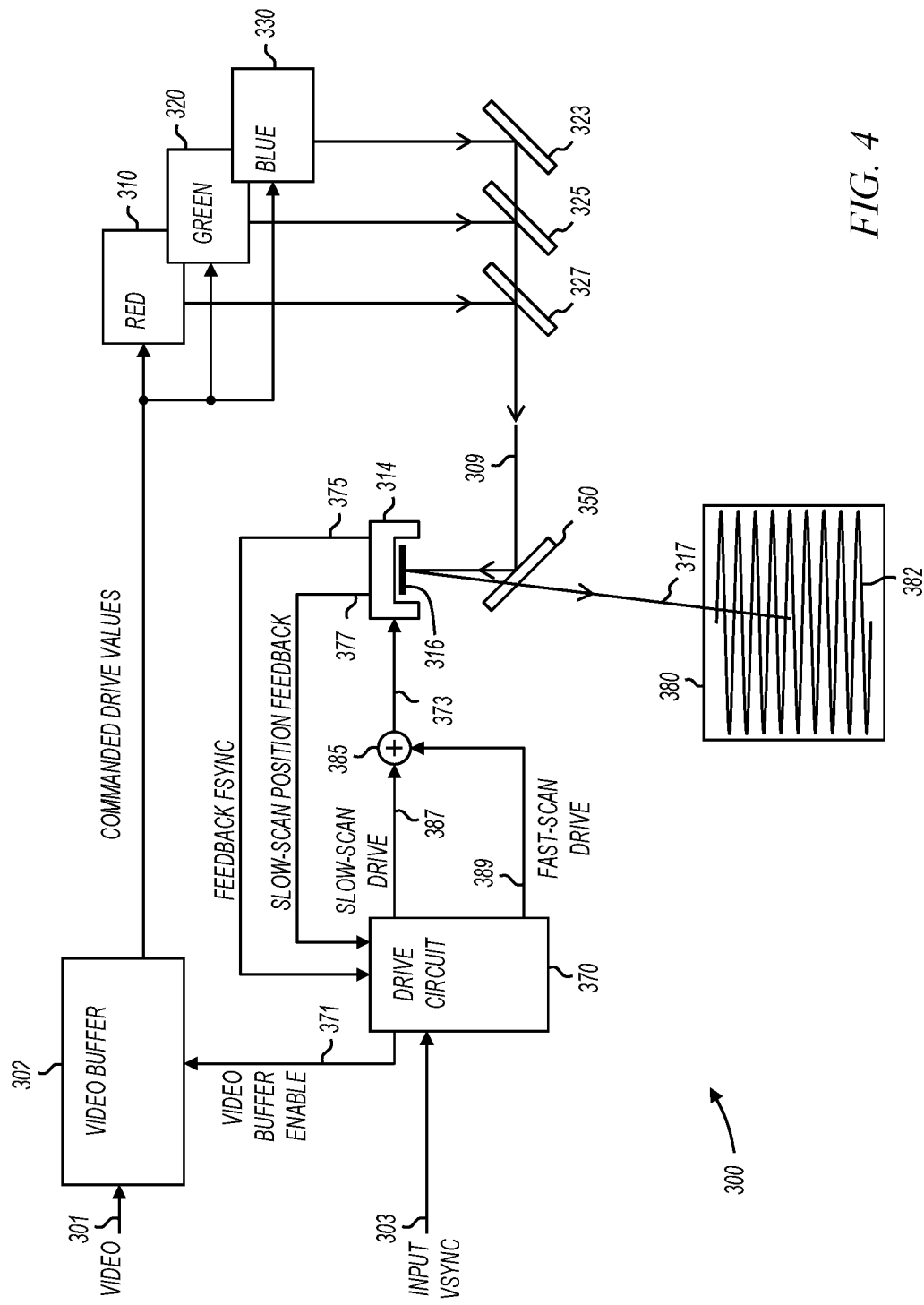
FIG. 4 shows a scanning laser projection system in accordance with various embodiments of the present invention.

FIG. 4 shows a scanning laser projection system in accordance with various embodiments of the present invention. Scanning laser projection system 300 includes video buffer 302, red laser module 310, green laser module 320, and blue laser module 330. Light from the laser modules is combined with dichroics 323, 325, and 327. Scanning laser projection system 300 also includes fold mirror 350, drive circuit 370, and MEMS device 314 with scanning mirror 316.

In some embodiments, the video data arrives row by row. For example, the first video data received may correspond to an upper left pixel in an image. Succeeding video data represents the remainder of the pixels in the top row from left to right, and then further rows from top to bottom. When the bottom right of the image is reached, then a complete "frame" of video data has been supplied. The rate at which frames of video data are received is referred to herein as the "frame rate." In typical applications, an input vertical sync (VSYNC) signal is received with the video data and is asserted once per frame. Accordingly, the input VSYNC is periodic at the frame rate.

In operation, video buffer 302 stores one or more rows of video content at 301 and provides commanded drive values to the laser modules starting when commanded by drive circuit 370 through the video buffer enable signal 371. The commanded drive values correspond to electrical currents for each of the red, green, and blue laser light modules such that the output intensity from the lasers is consistent with the input video content. In some embodiments, this process occurs at output pixel rates in excess of 150 MHz.

Each of red laser module 310, green laser module 320, and blue laser module 330 include a laser diode and a bi-acylindrical lens as described above with reference to FIGS. 1, 2A, and 2B. Each of the laser diodes may have a different divergence ratio, and each bi-acylindrical lens may be matched to a particular laser diode. For example, a red laser diode may have a first divergence ratio, a green laser diode may have a second divergence ratio, and a blue laser diode may have a third divergence ratio. The bi-acylindrical lens used to collimate light from the red laser diode may have a ratio of focal lengths substantially equal to the first divergence ratio, the bi-acylindrical lens used to collimate light from the green laser diode may have a ratio of focal lengths substantially equal to the second divergence ratio, and the bi-acylindrical lens used to collimate light from the blue laser diode may have a ratio of focal lengths substantially equal to the third divergence ratio.

The laser beams are then directed onto an ultra-high speed gimbal mounted 2 dimensional bi-axial laser scanning mirror 316. In some embodiments, this bi-axial scanning mirror is fabricated from silicon using MEMS processes. In some embodiments, as described below with reference to FIG. 6, two independent MEMS mirrors are employed in a combined optical system, each responsible for one of the scan axes. One axis of rotation is operated quasi-statically and creates a sawtooth raster trajectory. This axis is also referred to as the slow-scan axis. The second axis of rotation is orthogonal to the first and is operated on a resonant vibrational mode of the scanning mirror. In some embodiments, the MEMS device uses electromagnetic actuation, achieved using a miniature assembly containing the MEMS die and small subassemblies of permanent magnets and an electrical interface, although the various embodiments are not limited in this respect. For example, some embodiments employ electrostatic or piezoelectric actuation. Any type of mirror actuation may be employed without departing from the scope of the present invention. In some embodiments, the slow-scan axis corresponds to the vertical axis and the fast-scan axis corresponds to the horizontal axis, although this is not a limitation of the present invention. For example, a rotation of the projector may result in the fast-scan axis being the vertical axis and the slow-scan axis being the horizontal axis In some embodiments, raster scan 382 is formed by combining a sinusoidal component on the horizontal fast-scan axis and a sawtooth component on the vertical slow-scan axis. In these embodiments, output beam 317 sweeps horizontally (back and forth left-to-right) in a sinusoidal pattern, and sweeps vertically (top-to-bottom) in a sawtooth pattern with the display blanked during flyback (bottom-to-top). FIG. 4 shows the sinusoidal pattern as the beam sweeps vertically top-to-bottom, but does not show the flyback from bottom-to-top. In other embodiments, the vertical sweep is controlled with a triangular wave such that there is no flyback. In still further embodiments, the vertical sweep is sinusoidal or a non-symmetric scanning pattern. The various embodiments of the invention are not limited by the waveforms used to control the vertical and horizontal sweep or the resulting raster pattern.

A mirror drive circuit 370 provides a slow-scan drive signal on node 387 and a fast-scan drive signal on node 389. The fast-scan drive signal on node 389 includes an excitation signal to control the resonant angular motion of scanning mirror 316 on the fast-scan axis, and the slow-scan drive signal includes an excitation signal to cause deflection on the slow-scan axis. The slow-scan and fast-scan drive signals are combined by summer 385 to produce a drive signal used to drive MEMS device 314 on node 373. The resulting mirror deflection on both the fast and slow-scan axes causes output beam 317 to generate a raster scan 382 in field of view 380. In operation, the laser light sources produce light pulses for each output pixel and scanning mirror 316 reflects the light pulses as beam 317 traverses the raster pattern.

Mirror drive circuit 370 receives a feedback FSYNC signal from MEMS device 314 on node 375, and also receives a slow-scan position feedback signal on node 377. The feedback FSYNC signal on node 375 provides information regarding the position of scanning mirror 116 on the fast-scan axis as it oscillates at a resonant frequency. In some embodiments, the feedback FSYNC signal describes the instantaneous angular position of the mirror, and in other embodiments, the feedback signal describes the maximum deflection angle of the mirror, also referred to herein as the amplitude of the feedback signal. The slow-scan position feedback signal on node 377 provides information regarding the position of scanning mirror 316 on the slow-scan axis. In some embodiments, the slow-scan position feedback signal is used to phase lock movement on the slow-scan axis to the period of the input VSYNC signal received on node 303. In these embodiments, the frequency of movement on the slow-scan axis is dictated by a received sync signal (in this case, the input VSYNC).

In some embodiments, MEMS device 314 includes one or more analog-to-digital converters to digitize sensed position information. In these embodiments, either or both of the feedback FSYNC signal and the slow-scan position feedback signal are digital representations of the mirror position on the two axes. In other embodiments, the feedback signals are analog signals, and drive circuit 370 includes one or more analog-to-digital converters to digitize the feedback signals as appropriate.

In operation, drive circuit 370 excites resonant motion of scanning mirror 316 such that a constant maximum angular deflection on the fast-scan axis is maintained as shown in raster scan 382. Drive circuit 370 receives an input VSYNC signal on node 303. In some embodiments, the input VSYNC signal is received from the source of video data that is received on node 301. In these embodiments, the input VSYNC signal is periodic with a period corresponding to the frame rate of the video data on node 301.

Drive circuit 370 may be implemented in hardware, a programmable processor, or in any combination. For example, in some embodiments, drive circuit 370 is implemented in an application specific integrated circuit (ASIC). Further, in some embodiments, some of the faster data path control is performed in an ASIC and overall control is provided by a software programmable microprocessor. Examples of drive circuit implementations are described further below.

Although red, green, and blue laser light sources are shown in FIG. 4, the various embodiments of the invention are not limited by the wavelength of light emitted by the laser light sources. For example, in some embodiments, non-visible light (e.g., infrared light) is emitted instead of, or in addition to, visible light.

Figure 5:
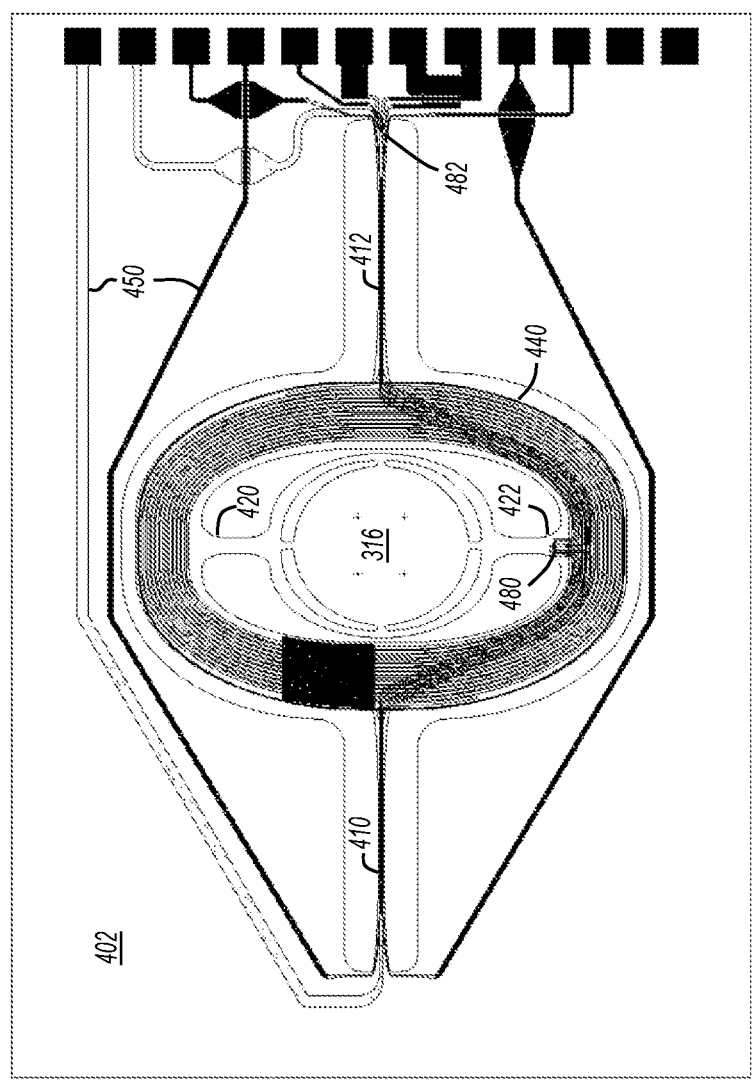
FIG. 5 shows a plan view of a microelectromechanical system (MEMS) device with a scanning mirror in accordance with various embodiments of the present invention.

FIG. 5 shows a plan view of a microelectromechanical system (MEMS) device with a scanning mirror. MEMS device 314 includes fixed platform 402, scanning platform 440, and scanning mirror 316. Scanning platform 440 is coupled to fixed platform 402 by flexures 410 and 412, and scanning mirror 316 is coupled to scanning platform 440 by flexures 420 and 422. Scanning platform 440 has a drive coil connected to drive lines 450, which are driven by a drive signal provided on node 373 from summer 385 (FIG. 4). The drive signal includes an excitation signal to excite resonant motion of scanning mirror 316 on the fast-scan axis, and also includes a slow-scan drive signal to cause non-resonant motion of scanning platform 440 on the slow-scan axis. Current driven into drive lines 450 produces a current in the drive coil.

In operation, an external magnetic field source (not shown) imposes a magnetic field on the drive coil. The magnetic field imposed on the drive coil by the external magnetic field source has a component in the plane of the coil, and is oriented non-orthogonally with respect to the two drive axes. The in-plane current in the coil windings interacts with the in-plane magnetic field to produce out-of-plane Lorentz forces on the conductors. Since the drive current forms a loop on scanning platform 440, the current reverses sign across the scan axes. This means the Lorentz forces also reverse sign across the scan axes, resulting in a torque in the plane of and normal to the magnetic field. This combined torque produces responses in the two scan directions depending on the frequency content of the torque.

The long axis of flexures 410 and 412 form a pivot axis. Flexures 410 and 412 are flexible members that undergo a torsional flexure, thereby allowing scanning platform 440 to rotate on the pivot axis and have an angular displacement relative to fixed platform 402. Flexures 410 and 412 are not limited to torsional embodiments as shown in FIG. 5. For example, in some embodiments, flexures 410 and 412 take on other shapes such as arcs, "S" shapes, or other serpentine shapes. The term "flexure" as used herein refers to any flexible member coupling a scanning platform to another platform (scanning or fixed), and capable of movement that allows the scanning platform to have an angular displacement with respect to the other platform.

Scanning mirror 316 pivots on a first axis formed by flexures 420 and 422, and pivots on a second axis formed by flexures 410 and 412. The first axis is referred to herein as the horizontal axis or fast-scan axis, and the second axis is referred to herein as the vertical axis or slow-scan axis. The distinction between vertical and horizontal is somewhat arbitrary, since a rotation of the scanning mirror will cause a rotation of the two axes. Accordingly, the various embodiments of the present invention are not to be limited by the terms "horizontal" and "vertical."

In some embodiments, scanning mirror 316 scans at a mechanically resonant frequency on the fast-scan axis resulting in a sinusoidal vertical sweep. Further, in some embodiments, scanning mirror 316 scans at a non-resonant frequency on the slow-scan axis, so the horizontal scan frequency and angular extents can be controlled independently.

MEMS device 314 also incorporates one or more integrated piezoresistive position sensors. Piezoresistive sensor 480 produces a voltage that represents the displacement of mirror 316 with respect to scanning platform 440, and this voltage is provided as the feedback FSYNC signal on node 375 (FIG. 4). Piezoresistive sensor 482 produces a voltage that represents the displacement of scanning platform 440 with respect to fixed platform 402, and this voltage is provided as the slow-scan position feedback signal on node 377 (FIG. 4). As shown in FIG. 5, in some embodiments, position sensors are provided on both scan axes, although this is not a limitation of the present invention. For example, in some embodiments, MEMS device 314 includes a position sensor on only one axis. In some embodiments, one or more analog-to-digital converters are included to digitize the voltages produced by the piezoresistive position sensors. In these embodiments, one or both of the FSYNC signal and slow-scan position feedback signal are provided as streams of digital data.

The particular MEMS device embodiment shown in FIG. 5 is provided as an example, and the various embodiments of the invention are not limited to this specific implementation. For example, any combination of scanning mirrors capable of sweeping in two dimensions to reflect a light beam in a raster pattern may be incorporated without departing from the scope of the present invention. Also for example, any combination of scanning mirrors (e.g., two mirrors: one for each axis) may be utilized to reflect a light beam in a raster pattern. Further, any type of mirror drive mechanism may be utilized without departing from the scope of the present invention. For example, although MEMS device 314 uses a drive coil on a moving platform with a static magnetic field, other embodiments may include a magnet on a moving platform with drive coil on a fixed platform. Further, the mirror drive mechanism may include an electrostatic and/or a piezoelectric drive mechanism.

Figure 6:
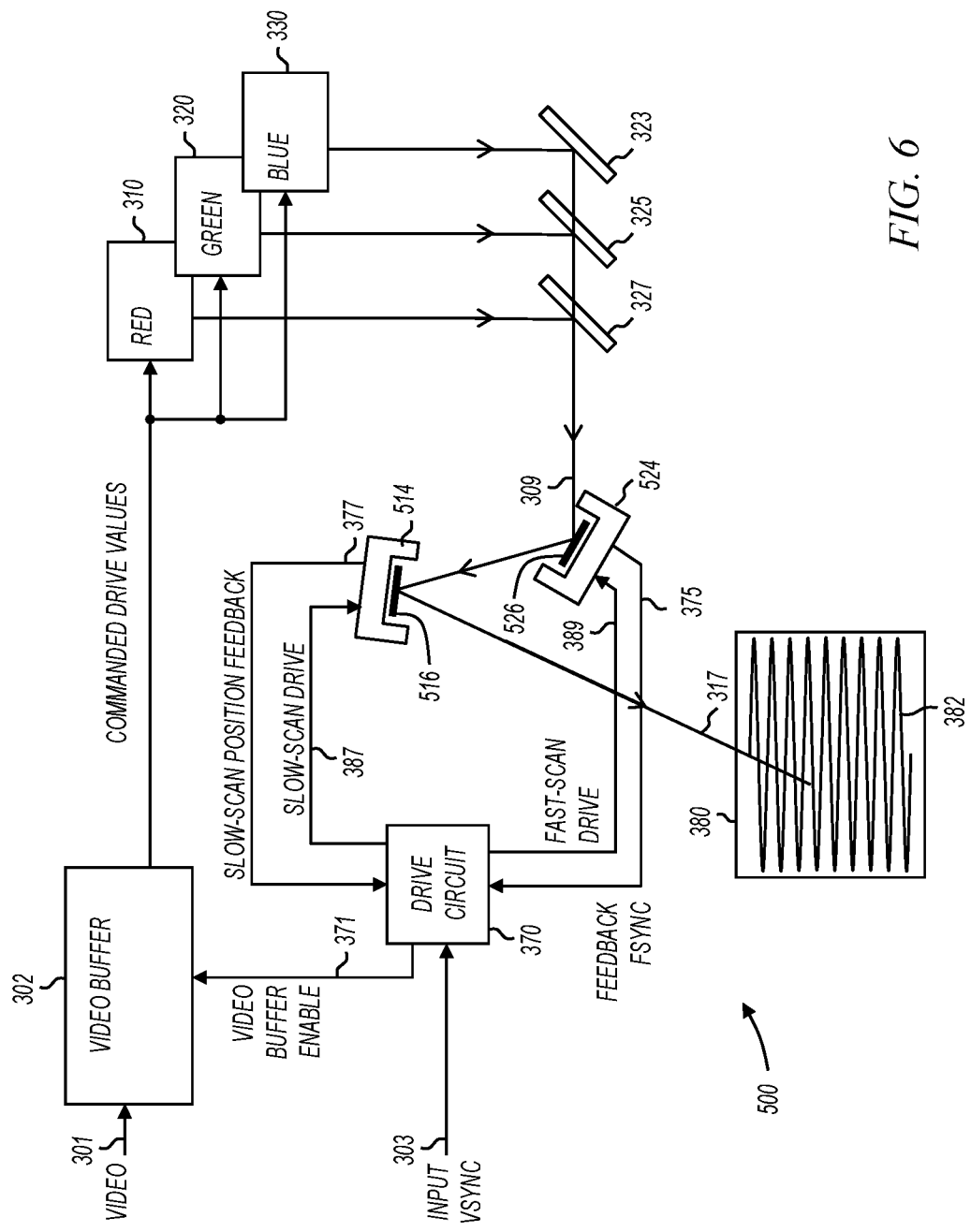
FIG. 6 shows a scanning laser projection system in accordance with various embodiments of the present invention.

FIG. 6 shows a scanning laser projection system in accordance with various embodiments of the present invention. Laser projection system 500 is similar to laser projector 300 (FIG. 4) with the exception that two scanning mirrors are present instead of one. In some embodiments, a first MEMS device 524 includes a scanning mirror 526 configured to deflect along one axis and a second MEMS device 514 includes a scanning mirror 516 configured to deflect along a second axis that is largely perpendicular to the first axis. Furthermore, in some embodiments, the first mirror is used for fast-scan motion, while the second mirror is used for slow-scan motion. In some embodiments, the fast-scan motion comprises resonant sinusoidal motion while the slow-scan motion comprises non-resonant quasi-static controlled motion.

Drive circuit 370 provides a fast-scan drive signal to MEMS device 524 on node 389 to excite motion of mirror 526, and receives a feedback sync signal FSYNC on node 375. Drive circuit 370 also provides a slow-scan drive signal to MEMS device 514 on node 387 to excite motion of mirror 516 and receives a slow-scan position feedback signal on node 377.

FIG. 7 shows a perspective view of a MEMS device with a scanning mirror in accordance with various embodiments of the present invention. MEMS device 524 includes fixed platforms 602, scanning platform 600, and scanning mirror 526. Scanning platform 600 is coupled to fixed platforms 602 by flexures 606. Scanning platform 600 has a drive coil 608 connected to contacts 610, which are driven by a fast-scan drive signal provided on node 389 from drive control circuit 330 (FIG. 6).

The axis of flexures 606 forms a pivot axis. Flexures 606 are flexible members that undergo a torsional flexure, thereby allowing scanning platform 600 to rotate on the pivot axis and have an angular displacement relative to fixed platforms 602. Flexures 606 are not limited to torsional embodiments as shown in FIG. 7. For example, in some embodiments, flexures 606 take on other shapes such as arcs, "S" shapes, or other serpentine shapes.

In operation, an external magnetic field source (not shown) imposes a magnetic field on the drive coil. The magnetic field imposed on the drive coil by the external magnetic field source has a component in the plane of the coil. The in-plane current in the coil windings interacts with the in-plane magnetic field to produce out-of-plane Lorentz forces on the conductors. Since the drive current forms a loop on scanning platform 600, the current reverses sign across the scan axis. This means the Lorentz forces also reverse sign across the scan axis, resulting in a torque in the plane of and normal to the magnetic field. This combined torque produces a response on the scan axis depending on the frequency content of the torque. In some embodiments, scanning platform 600 and mirror 526 scan at a mechanically resonant frequency on the fast-scan axis resulting in a sinusoidal sweep.

MEMS device 524 also incorporates one or more integrated piezoresistive position sensors. Piezoresistive sensor 620 produces a voltage that represents the displacement of scanning platform 600 and mirror 526 with respect to fixed platforms 602. Piezoresistive sensor 620 is coupled to contact 612. The voltage on contact 612 is provided as the feedback FSYNC signal on node 375 (FIG. 6). In some embodiments, the FSYNC signal is provided as an analog signal. In other embodiments, the FSYNC signal is digitized using a comparator (not shown) or an analog-to-digital converter (not shown) such that a digital feedback signal is provided on node 375 (FIG. 6).

Much of MEMS device 524 can be fabricated from a single common substrate using MEMS techniques. For example, the fixed platforms 602, the scanning platform 600 and the two flexures 606 can all be formed from the same substrate. Additionally, in some embodiments, the drive coil 608 and contacts 610 and 612 can also be formed with any suitable MEMS technique. For example, the drive coil 608 and contacts 610 and 612 can be formed by the selective deposition and patterning of conductive materials on the substrate.

FIGS. 8A and 8B show plan views of a MEMS device with a scanning mirror in accordance with various embodiments of the present invention. MEMS device 514 includes a stationary mount portion 702, a movable portion 700, two flexures 706, coil traces 708, and contacts 710. In operation, the movable portion 700 facilitates the motion of the attached mirror 516 to facilitate scanning in a laser scanning device.

The stationary mount portion 702 is located in a central portion of the MEMS device 514. The stationary mount portion 702 is configured to be mounted to a die carrier in a scanner assembly (not shown in FIG. 8) or other suitable device.

The movable portion 700 substantially surrounds the stationary mount portion 702 and is coupled to the mirror 516 through attachment structures (not shown). In some embodiments, the attachment structures serve to offset the mirror 516 away from the movable portion 700. This offset of the mirror 516 away from the movable portion 700 allows the mirror 516 to rotate without impacting the stationary mount portion 702.

The movable portion 700 includes coil traces 708 while the stationary mount portion 702 includes various contacts 710 and 712. The coil traces 708 are configured to interact with applied magnetic fields and generate non-resonant or quasi-static motion. In some embodiments, coil traces 708 circumscribe the stationary mount portion 702 so that the stationary mount portion 702 is located substantially in the center of the coil traces 708; however, this is not a limitation of the present invention. In some embodiments, separate and independent coil traces on either side of the stationary mount portion 702 are used. In further embodiments, coil traces are formed on the attachment structures (not shown).

Contacts 710 and 712 provide electrical connections between the movable portion 700 and stationary portion 702. Contacts 710 provide electrical connections to coil traces 708, and contact 712 provides an electrical connection to position sensor 720.

The two flexures 706 are located on opposing sides of the stationary mount portion 702 and extend outwardly from the stationary mount portion 702 to the movable portion 700 to form a pivot axis. So configured, the two flexures 706 flexibly couple the stationary mount portion 702 to the movable portion 700 to facilitate movement of the movable portion 700 with respect to the stationary mount portion 702 along the pivot axis. Specifically, the two flexures 706 allow the movable portion 700 and the mirror 516 to rotate about the pivot axis. This rotation of the mirror 516 facilitates the use of the mirror 516 to reflect a laser beam through angular extents in a scan pattern.

During operation, drive circuit 370 (FIG. 6) provides a slow-scan drive signal to the coil trace 708 through contacts 710. The applied slow-scan drive signal creates electromagnetic interactions between the coil trace 708 and an applied magnetic field, and those interactions excite motion of the movable portion 700 and the attached mirror 516. The resulting motion of mirror 516 can be configured to reflect laser light into a pattern of scan lines, and thus can facilitate laser depth sensing.

MEMS device 514 also incorporates one or more integrated piezoresistive position sensors 720. Piezoresistive sensor 720 produces a voltage that represents the displacement of mirror 516 with respect to stationary portion 702, and this voltage is provided as the slow-scan position feedback signal on node 377 (FIG. 6). In some embodiments, the slow-scan position feedback signal is provided as an analog signal. In other embodiments, the slow-scan position feedback signal is digitized using an analog-to-digital converter (not shown) such that a digital feedback signal is provided on node 377 (FIG. 6).

Much of MEMS device 514 can be fabricated from a single common substrate using MEMS techniques. Thus, the stationary mount portion 702, the movable portion 700 and the two flexures 706 can all be formed from the same substrate. Additionally, in some embodiments attachment structures can also be formed from the same substrate, while in other embodiments the attachment structures are formed separately or as part of the mirror 516. The coil traces 708 and contacts 710 and 712 can also be formed with any suitable MEMS technique. For example, the coil traces 708 and contacts 710 and 712 can be formed by the selective deposition and patterning of conductive materials on the substrate.

Figure 9:
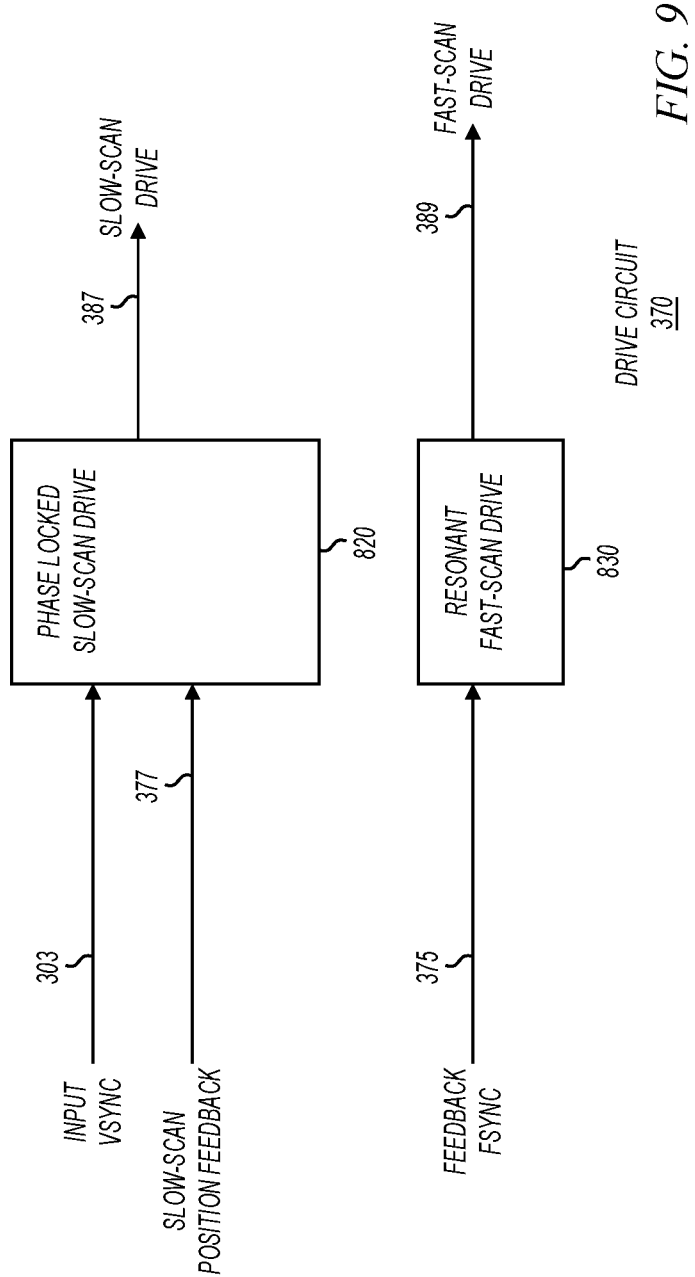
FIG. 9 shows a block diagram of a drive circuit in accordance with various embodiments of the present invention.

FIG. 9 shows a block diagram of a drive circuit in accordance with various embodiments of the present invention. Drive circuit 370 includes phase locked slow-scan drive circuit 820 and resonant fast-scan drive circuit 830. Phase locked slow-scan drive circuit 820 produces the slow scan drive signal on node 387, and resonant fast-scan drive circuit 830 produces the fast-scan drive signal on node 389.

Resonant fast-scan drive circuit 830 provides periodic excitations to cause the scanning mirror to oscillate at the mechanical resonant frequency on the fast-scan axis. Resonant fast scan drive circuit 830 receives the feedback FSYNC signal on node 375 as a feedback signal. Resonant fast scan drive circuit 830 includes a control circuit that may alter the timing or amplitude of its output signal as a function of the feedback FSYNC signal.

Phase locked slow-scan drive circuit 820 provides the slow-scan drive signal on node 387 to cause the scanning mirror to sweep on the slow-scan axis. The slow-scan drive signal on node 387 works in combination with the mirror dynamics resulting in the desired mirror movement on the slow-scan axis. Phase locked slow-scan drive circuit 820 receives the input VSYNC signal on node 303 and the slow-scan position feedback signal from the scanning mirror on node 377. In some embodiments, phase locked slow-scan drive circuit 820 phase locks the slow-scan drive signal on node 387 to the input VSYNC to lock the slow-scan sweep of either scanning mirror 316 (FIGS. 4, 5) or scanning mirror 516 (FIGS. 6, 8) to the input VSYNC Phase locked slow-scan drive circuit 820 and resonant fast-scan drive circuit 830 may be implemented in hardware, a programmable processor, or in any combination. For example, in some embodiments, phase locked slow-scan drive circuit 820 and resonant fast-scan drive circuit 830 are implemented with phase comparators, frequency multipliers and/or dividers, numerically controlled oscillators, loop filters, and the like. Also for example, phase locked slow-scan drive circuit 820 and resonant fast-scan drive circuit 830 may be implemented in an application specific integrated circuit (ASIC). Further, in some embodiments, some of the faster data path control is performed in an ASIC and overall control is provided by a software programmable microprocessor. The manner in which these circuits are implemented is not a limitation of the present invention.

Figure 10:
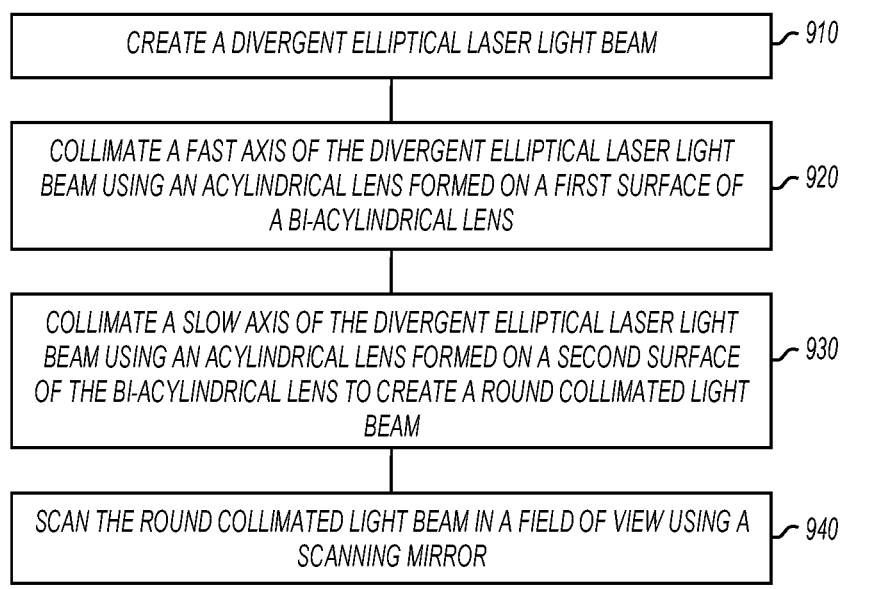
FIG. 10 shows a flow diagram of methods in accordance with various embodiments of the present invention.

FIG. 10 shows a flow diagram of methods in accordance with various embodiments of the present invention. In some embodiments, method 900, or portions thereof, is performed by a scanning laser projection system. In other embodiments, method 900 is performed by a series of circuits or an electronic system. Method 900 is not limited by the particular type of apparatus performing the method. The various actions in method 900 may be performed in the order presented, or may be performed in a different order. Further, in some embodiments, some actions listed in FIG. 10 are omitted from method 900.

Method 900 is shown beginning with block 910. As shown at 910, a divergent elliptical laser beam is created. In some embodiments, this corresponds to the operation of a laser diode such as laser diode 140 (FIG. 1). At 920, a fast axis of the divergent elliptical beam is collimated using an acylindrical lens formed on a first surface of a bi-acylindrical lens. For example, the acylindrical lens formed on surface 110 of bi-acylindrical lens 100 collimates the fast axis of beam 150 (FIG. 1). At 930, a slow axis of the divergent elliptical beam is collimated using an acylindrical lens formed on a second surface of the bi-acylindrical lens to create a round collimated light beam. For example, the acylindrical lens formed on surface 120 of bi-acylindrical lens 100 collimates the slow axis of beam 150 to create round collimated beam 160 (FIG. 1).

At 940, the round collimated beam is scanned to in a field of view using a scanning mirror. In some embodiments, a bi-axial scanning mirror is used to scan the light beam on two axes. For example, scanning mirror 316 (FIG. 4) may be used to scan the light beam. In other embodiments, a first scanning mirror is used to scan the light beam in first dimension, and a second scanning mirror is used to scan the light beam in a second dimension. For example, scanning mirrors 516 and 526 (FIG. 6) may be used to scan the light beam.

Figure 11:
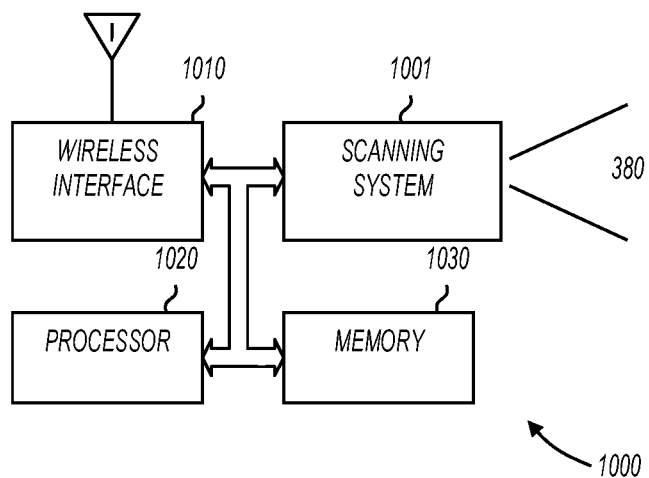
FIG. 11 shows a block diagram of a mobile device in accordance with various embodiments of the present invention.

FIG. 11 shows a block diagram of a mobile device in accordance with various embodiments of the present invention. As shown in FIG. 11, mobile device 1000 includes wireless interface 1010, processor 1020, memory 1030, and scanning system 1001. Scanning system 1001 includes one or more bi-acylindrical lenses as described above.

Scanning system 1001 may receive image data from any image source. For example, in some embodiments, scanning system 1001 includes memory that holds still images. In other embodiments, scanning system 1001 includes memory that includes video images. In still further embodiments, scanning system 1001 displays imagery received from external sources such as connectors, wireless interface 1010, a wired interface, or the like.

Wireless interface 1010 may include any wireless transmission and/or reception capabilities. For example, in some embodiments, wireless interface 1010 includes a network interface card (NIC) capable of communicating over a wireless network. Also for example, in some embodiments, wireless interface 1010 may include cellular telephone capabilities. In still further embodiments, wireless interface 1010 may include a global positioning system (GPS) receiver. One skilled in the art will understand that wireless interface 1010 may include any type of wireless communications capability without departing from the scope of the present invention.

Processor 1020 may be any type of processor capable of communicating with the various components in mobile device 1000. For example, processor 1020 may be an embedded processor available from application specific integrated circuit (ASIC) vendors, or may be a commercially available microprocessor. In some embodiments, processor 1020 provides image or video data to scanning system 1001. The image or video data may be retrieved from wireless interface 1010 or may be derived from data retrieved from wireless interface 1010. For example, through processor 1020, scanning system 1001 may display images or video received directly from wireless interface 1010. Also for example, processor 1020 may provide overlays to add to images and/or video received from wireless interface 1010, or may alter stored imagery based on data received from wireless interface 1010 (e.g., modifying a map display in GPS embodiments in which wireless interface 1010 provides location coordinates).

Figure 12:
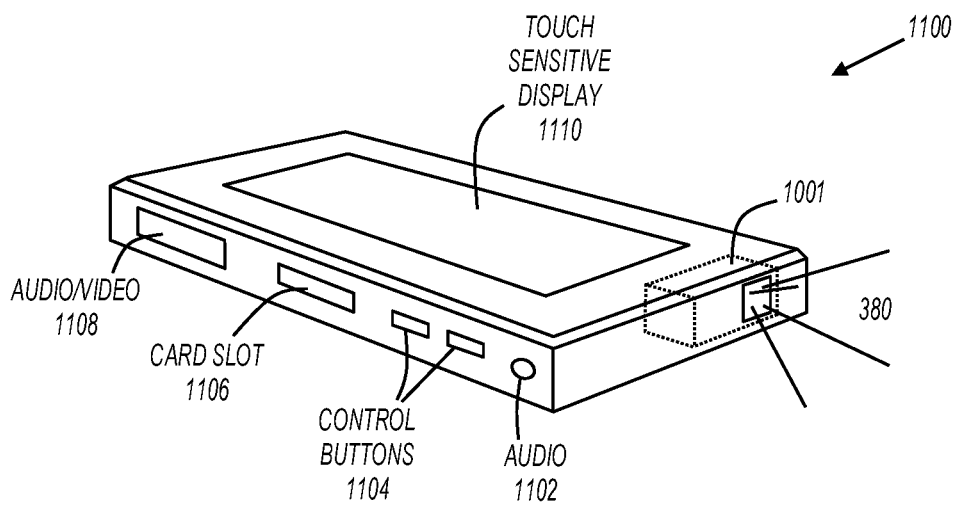
FIG. 12 shows a mobile device in accordance with various embodiments of the present invention.

FIG. 12 shows a mobile device in accordance with various embodiments of the present invention. Mobile device 1100 may be a hand held scanning laser projection system with or without communications ability. For example, in some embodiments, mobile device 1100 may be a scanning laser projection system with little or no other capabilities. Also for example, in some embodiments, mobile device 1100 may be a device usable for communications, including for example, a cellular phone, a smart phone, a tablet computing device, a global positioning system (GPS) receiver, or the like. Further, mobile device 1100 may be connected to a larger network via a wireless (e.g., cellular), or this device can accept and/or transmit data messages or video content via an unregulated spectrum (e.g., WiFi) connection.

Mobile device 1100 includes scanning system 1001, touch sensitive display 1110, audio port 1102, control buttons 1104, card slot 1106, and audio/video (A/V) port 1108. None of these elements are essential. For example, mobile device 1100 may only include scanning system 1001 without any of touch sensitive display 1110, audio port 1102, control buttons 1104, card slot 1106, or A/V port 1108. Some embodiments include a subset of these elements. For example, an accessory projector may include scanning system 1001, control buttons 1104 and A/V port 1108. A smartphone embodiment may combine touch sensitive display device 1110 and scanning system 1001.

Touch sensitive display 1110 may be any type of display. For example, in some embodiments, touch sensitive display 1110 includes a liquid crystal display (LCD) screen. In some embodiments, display 1110 is not touch sensitive. Display 1110 may or may not always display the image projected by scanning system 1001. For example, an accessory product may always display the projected image on display 1110, whereas a mobile phone embodiment may project a video while displaying different content on display 1110. Some embodiments may include a keypad in addition to touch sensitive display 1110.

A/V port 1108 accepts and/or transmits video and/or audio signals. For example, A/V port 1108 may be a digital port, such as a high definition multimedia interface (HDMI) interface that accepts a cable suitable to carry digital audio and video data. Further, A/V port 1108 may include RCA jacks to accept or transmit composite inputs. Still further, A/V port 1108 may include a VGA connector to accept or transmit analog video signals. In some embodiments, mobile device 1100 may be tethered to an external signal source through A/V port 1108, and mobile device 1100 may project content accepted through A/V port 1108. In other embodiments, mobile device 1100 may be an originator of content, and A/V port 1108 is used to transmit content to a different device.

Audio port 1102 provides audio signals. For example, in some embodiments, mobile device 1100 is a media recorder that can record and play audio and video. In these embodiments, the video may be projected by scanning system 1001 and the audio may be output at audio port 1102.

Mobile device 1100 also includes card slot 1106. In some embodiments, a memory card inserted in card slot 1106 may provide a source for audio to be output at audio port 1102 and/or video data to be projected by scanning laser projector 1001. Card slot 1106 may receive any type of solid state memory device, including for example secure digital (SD) memory cards.

Figure 13:
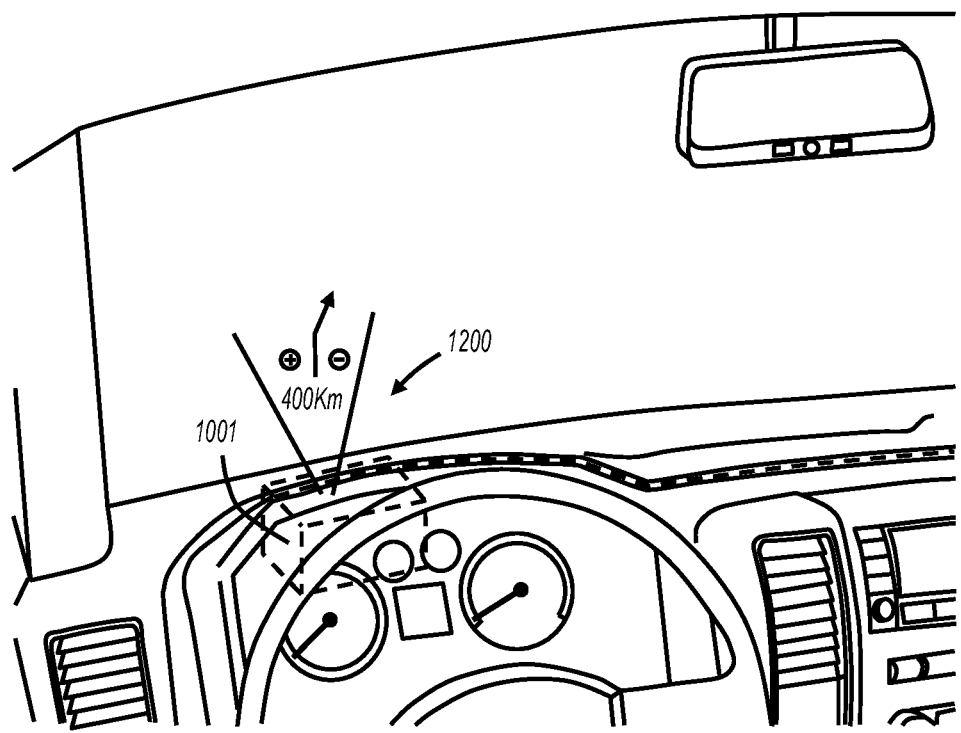
FIG. 13 shows a head-up display system in accordance with various embodiments of the present invention.

FIG. 13 shows a head-up display system in accordance with various embodiments of the invention. Scanning system 1001 is shown as a projector mounted in a vehicle dash to project the head-up display at 1200. Although an automotive head-up display is shown in FIG. 13, this is not a limitation of the present invention. For example, various embodiments of the invention include head-up displays in avionics application, air traffic control applications, and other applications.

Figure 14:
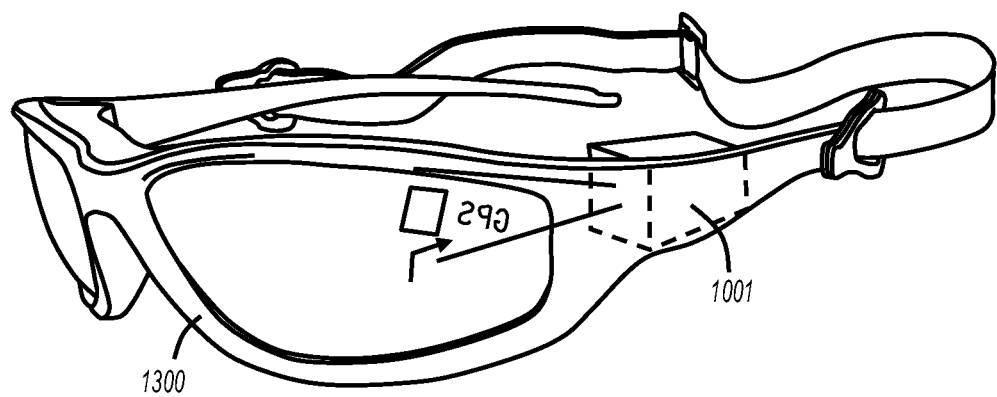
FIG. 14 shows eyewear in accordance with various embodiments of the present invention.

FIG. 14 shows eyewear in accordance with various embodiments of the invention. Scanning system 1001 is shown as a projector mounted in eyewear 1300 to project a display in the eyewear's field of view. In some embodiments, eyewear 1300 is see-through and in other embodiments, eyewear 1300 is opaque. For example, eyewear 1300 may be used in an augmented reality application in which a wearer can see the display from scanning system 1001 overlaid on the physical world. Also for example, eyewear 1300 may be used in a virtual reality application, in which a wearer's entire view is generated by scanning system 1001. Although only one scanning system 1001 is shown in FIG. 14, this is not a limitation of the present invention. For example, in some embodiments, eyewear 1300 includes two projectors; one for each eye.

Figure 15:
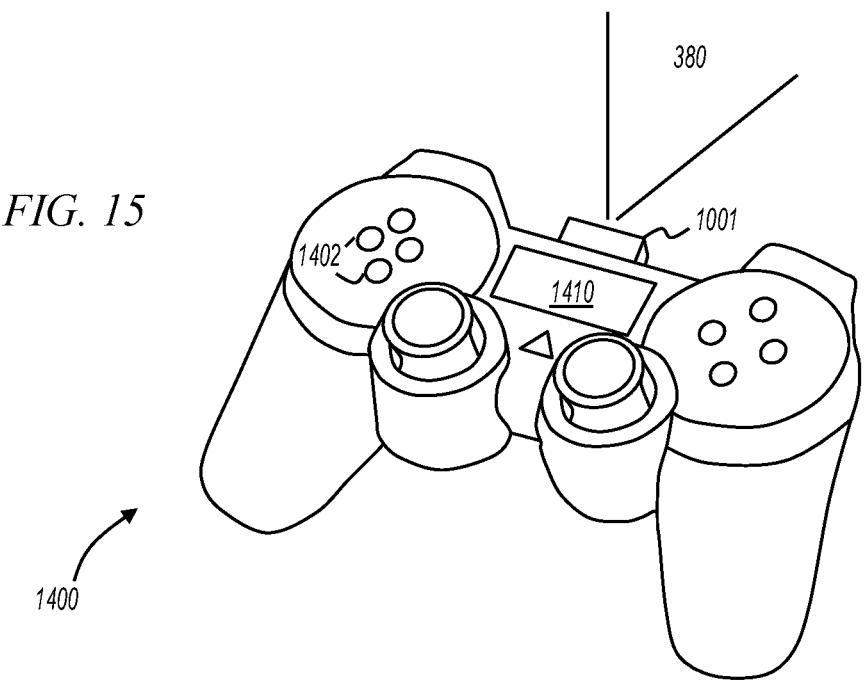
FIG. 15 shows a gaming apparatus in accordance with various embodiments of the present invention.

FIG. 15 shows a gaming apparatus in accordance with various embodiments of the present invention. Gaming apparatus 1400 includes buttons 1402, display 1410, and scanning system 1001. In some embodiments, gaming apparatus 1400 is a standalone apparatus that does not need a larger console for a user to play a game. For example, a user may play a game while watching display 1410 and/or the projected content at 380. In other embodiments, gaming apparatus 1400 operates as a controller for a larger gaming console. In these embodiments, a user may watch a larger screen tethered to the console in combination with watching display 1410 and/or projected content at 380.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A bi-acylindrical lens comprising:
a first surface shaped as a first acylindrical lens having a first axis; and
a second surface shaped as a second acylindrical lens having a second axis, wherein the second axis is oriented substantially 90 degrees with respect to the first axis;
wherein the first acylindrical lens has a first focal length and the second acylindrical lens has a second focal length, where a ratio of the first focal length to the second focal length is substantially equal to a laser diode divergence ratio.

2. The bi-acylindrical lens of claim 1 wherein the bi-acylindrical lens comprises glass.

3. The bi-acylindrical lens of claim 1 wherein the bi-acylindrical lens comprises plastic.

4. An apparatus comprising:
a first laser diode that emits a light beam that diverges at different rates on a fast axis and a slow axis; and
a first lens positioned to collimate the light beam, wherein a first surface of the lens is shaped to collimate the light beam on the fast axis, and a second surface of the lens is shaped to collimate the light beam on the slow axis;
wherein the first surface is shaped as an acylindrical lens having a first axis and the second surface is shaped as an acylindrical lens having a second axis, wherein the first axis is oriented at substantially 90 degrees with respect to the second axis, and wherein a rate of divergence on the slow axis divided by a rate of divergence on the fast axis defines a divergence ratio, and a ratio of focal lengths of the first and second surfaces shaped as acylindrical lenses is substantially equal to the divergence ratio.

5. The apparatus of claim 4 further comprising:
a second laser diode to emit a second light beam having a wavelength different from that of the first laser diode; and
a second lens positioned to collimate the second light beam.

6. The apparatus of claim 5 further comprising:
a third laser diode to emit a third light beam having a wavelength different from that of the first laser diode and the second laser diode; and
a third lens positioned to collimate the third light beam.

7. The apparatus of claim 4 wherein the first lens comprises glass.

8. The apparatus of claim 4 wherein the first lens comprises plastic.

9. A scanning laser projection system comprising:
a laser diode that emits a divergent elliptical light beam that diverges at different rates on a fast axis and a slow axis;
a bi-acylindrical lens positioned to collimate the divergent elliptical light beam into a substantially circular light beam, wherein the bi-acylindrical lens includes a first surface shaped as a first acylindrical lens having a first axis and includes a second surface shaped as a second acylindrical lens having a second axis, wherein the second axis is oriented substantially 90 degrees with respect to the first axis, and wherein a rate of divergence on the slow axis divided by a rate of divergence on the fast axis defines a divergence ratio, and a ratio of focal lengths of the first and second surfaces shaped as acylindrical lenses is substantially equal to the divergence ratio; and
a scanning mirror positioned to reflect and scan the substantially circular light beam.

10. The scanning laser projection system of claim 9 further comprising three laser diodes to emit light at different wavelengths, and three bi-acylindrical lenses to collimate light beams from the three laser diodes.

11. The scanning laser projection system of claim 9 wherein the bi-acylindrical lens comprises glass.

12. The scanning laser projection system of claim 9 wherein the bi-acylindrical lens comprises plastic.

13. The scanning laser projection system of claim 9 wherein the scanning mirror comprises a single biaxial scanning mirror.

14. The scanning laser projection system of claim 9 wherein the scanning mirror comprises a first scanning mirror configured to scan at a resonant mode in a fast scan direction, and a second scanning mirror configured to scan quasi-statically in a slow-scan direction substantially orthogonal to the fast scan direction.

* * * * *